Sept. 30, 1969 WOLF-DIETER BENSINGER 3,469,505
POLYGONAL PISTON FOR A ROTARY PISTON INTERNAL COMBUSTION ENGINE
Filed Sept. 5, 1967

INVENTOR
WOLF-DIETER BENSINGER

BY *Craig & Antonelli*

ATTORNEYS

United States Patent Office 3,469,505
Patented Sept. 30, 1969

3,469,505
POLYGONAL PISTON FOR A ROTARY PISTON INTERNAL COMBUSTION ENGINE
Wolf-Dieter Bensinger, Stuttgart-Riedenberg, Germany, assignor to Daimler-Benz Aktiengesellschaft, Stuttgart-Unterturkheim, Germany
Filed Sept. 5, 1967, Ser. No. 665,398
Claims priority, application Germany, Sept. 7, 1966, D 51,042
Int. Cl. F16j 1/00; F02b 55/06
U.S. Cl. 92—177                                22 Claims

ABSTRACT OF THE DISCLOSURE

A polygonal piston for a rotary piston internal combustion engine, particularly of trochoidal construction, which is provided with closed chambers underneath the piston flanks and cooling chambers arranged in the piston corners; the piston is additionally provided with apertures on both sides of the hub within the area of the cooling chambers so as to enable the cooling medium to enter and leave the cooling chambers, thereby effectively cooling the piston corners.

Background of the invention

Figure 1:
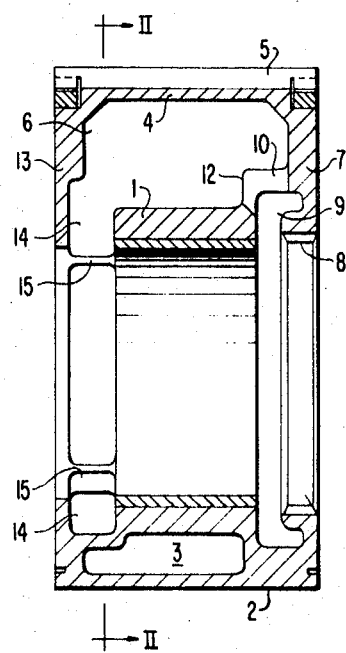

The present invention relates to a polygonal piston for a rotary piston internal combustion engine, especially to an internal combustion engine of trochoidal construction, which is provided with chambers, arranged between the piston hub and the piston flanks including the piston corners.

Summary of the invention

The present invention is concerned with the task to construct pistons for rotary piston internal combustion engines in the interest of a favorable fuel preparation in such a manner that the flanks of the piston remain uncooled and only the corners are cooled, in which the sealing bars are arranged.

The underlying problems are solved in accordance with the present invention in that chambers closed on all sides are provided between the piston hub and the piston flanks and (cooling) chambers are provided in the piston corners which are open radially inwardly on both sides of the piston hub.

The arrangement of chambers closed on all sides below the piston flanks makes it possible that the piston flanks store up the heat absorbed during the operation of the internal combustion engine. The piston flanks which become hot as a result thereof, contribute significantly to the preparation of the fuel to be combusted.

The chambers arranged in the piston corners may be cooled advantageously by the oil escaping out of the bearing of the piston and out of the bearings of the eccentric shaft supporting the piston since these spaces are relatively small. It is not necessary in that case to maintain a separate cooling oil circulatory system in addition to the lubricating oil circulatory system.

According to one advantageous construction of the piston in accordance with the present invention, the chambers in the piston corners may be provided on one side of the piston hub with apertures, which are provided along the radially outer circumference of an annular groove, extending parallelly to the end wall of the piston, and whose forward halves, as viewed in relation to the direction of rotation of the piston, are respectively covered off by ribs. Oil escaping at the piston hub from the bearing of the piston on its eccentric shaft is collected in the annular groove and reaches the chamber located within the piston corners through the apertures. The ribs closing off the apertures to one half the extent thereof prevent a discharge of the oil out of these chambers so that the oil has to flow through the chambers whereby it removes heat from the piston corners and cools the piston at these places.

On the other side of the piston hub, the chambers in the piston corners may continue in annular spaces disposed adjacent the piston hub which, in relation to the direction of rotation of the piston, are closed off in front by a wall extending radially up to the hub diameter and which extend in the direction opposite the direction of rotation of the piston to the following (trailing) chamber. The oil escaping at the piston hub on this side of the piston out of the bearing thereof is conducted through these annular spaces into the chambers within the piston corners from where it is conducted, together with the oil which has escaped at the other piston side, radially inwardly by the wall projecting to the piston hub until it leaves the engine space through apertures in the associated lateral portion of the internal combustion engine housing.

Accordingly, it is an object of the present invention to provide a polygonal piston for a rotary piston internal combustion engine which obviates in a simple and effective manner the shortcomings mentioned hereinabove encountered with the prior art constructions.

Another object of the present invention resides in a polygonal piston for a rotary piston internal combustion engine which is so constructed as to improve the fuel preparation of the engine.

A further object of the present invention resides in a piston-cooling system for a polygonal piston of rotary piston internal combustion engines which permits the piston flanks to remain essentially hot while permitting cooling of the piston corners, accommodating the sealing bars.

A still further object of the present invention resides in a polygonal piston for rotary piston internal combustion engines which achieves all of the aforementioned aims and objects without the need for a separate cooling-oil circulatory system in addition to the lubricating-oil circulatory system.

Figure 2:
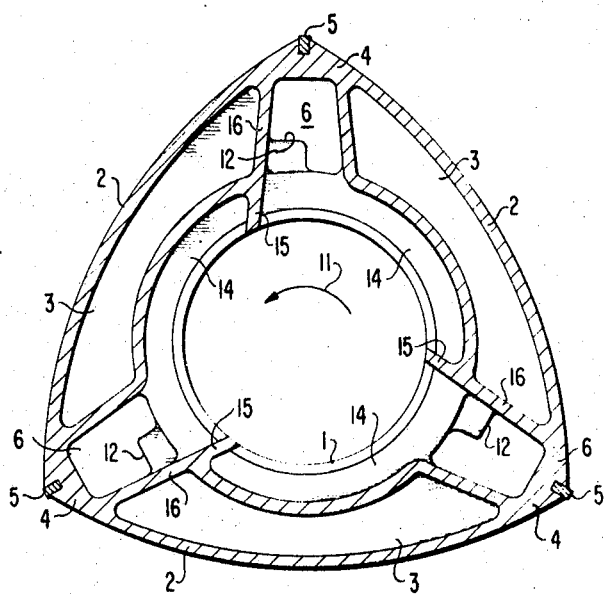

These and further objects, features, and advantages of the present invention will become more obvious from the following description when taken in connection with the accompanying drawing, which shows, for purposes of illustration only, one embodiment in accordance with the present invention, and wherein:

FIGURE 1 is an axial, longitudinal cross-sectional view through a three-cornered piston in accordance with the present invention, and FIGURE 2 is a transverse cross-sectional view through the piston of FIGURE 1, taken along line II—II of FIGURE 1.

Referring now to the drawing wherein like reference numerals are used throughout the two views to designate like parts, reference numeral 1 designates the hub of the illustrated piston while reference numeral 2 designates the three piston flanks thereof. One chamber 3, closed off on all sides, is provided between the hub 1 and each flank 2. As a result thereof, the flanks 2 are able to store heat during the operation of the internal combustion engine for which the piston is intended, and are able thereby to influence favorably the fuel preparation in the internal combustion engine.

In contrast to the flanks 2, the corners 4 of the piston disposed between the flanks 2, within which are arranged the sealing bars 5, are cooled by means of oil. For this purpose chambers 6 are provided in the corners 4 which are open radially inwardly on both sides of the hub 1.

The annular groove 9 is located adjacent the hub 1 and parallel to the end wall 7 on the side of the piston having the end wall 7; the hollow ring gear 8 is rigidly arranged, either by welding or formed in one piece therewith, at the end wall 7. Within the area of each chamber 6, the radially outer circumference of this annular groove 9 is in communication with the chambers 6 by way of apertures 10. The forward half—in relation to the direction of rotation 11 of the piston—is covered off in these apertures 10 by means of ribs 12.

On the other side of the piston within the area of its end wall 13, the chambers 6 continue in annular spaces 14 extending adjacent the hub 1. Each annular space 14 is thereby closed off by a forwardly disposed wall 15, as viewed in the direction of rotation 11 of the piston, which projects radially to the inner diameter of the hub 1 and is disposed in the extension of the forward separating wall 16 separating the chamber 6 from the chamber 3. Each annular space 14, therefore, extends from the associated chamber 6 to the next trailing chamber 6 following in a direction opposite the direction of rotation of the piston.

Operation

During operation of the piston in a rotary piston internal combustion engine, oil escaping out of the bearing support of the piston on its eccentric shaft is centrifuged into the chambers 6 on both sides of the hub 1. On one side of the piston, the oil is collected by the annular groove 9 and enters the chambers 6 by way of the apertures 10. On the other side of the piston, the oil is collected by the annular spaces 14 and is conducted from the latter into the chambers 6.

Whereas the ribs 12 prevent on the one side of the piston the discharge of the oil out of the chambers 6, the walls 15 on the other side of the piston have the purpose to conduct oil which has absorbed heat in chambers 6, out of the chambers in order that it can flow off through apertures provided in the associated lateral part of the housing and can return to the supply tank.

I claim:

1. A polygonal piston for a rotary internal combustion engine, especially of trochoidal construction, which includes a piston hub and outer walls forming piston flanks and piston corners, characterized by first and second chamber means between said hub and said outer walls, said first chamber means being disposed between said hub and said flanks directly below the outer walls forming said flanks and being closed off, and said second chamber means being provided in the piston corners and being open radially inwardly thereof to provide communicating passages for a coolant.

2. A polygonal piston according to claim 1, wherein said first chamber means are closed off on all sides, and said second chamber means are open radially inwardly thereof on both sides of the hub.

3. A piston according to claim 2, wherein the second chamber means in the piston corners are provided on one side of the piston hub with aperture means located at the radially outer circumference of annular groove means and establishing a communication therewith.

4. A piston according to claim 3, wherein the annular groove means extend substantially parallelly to an end wall of the piston on the respective side thereof.

5. A piston according to claim 4, further comprising rib means closing off a portion of said aperture means within the forward area thereof in relation to the direction of rotation of the piston.

6. A piston according to claim 5, wherein said rib means close off about one-half of each aperture means.

7. A piston according to claim 6, whrein the second chamber means extend on the other side of the piston hub into annular space means disposed adjacent the piston hub, and wall means closing off said annular space means forwardly thereof in relation to the direction of rotation of the piston.

8. A piston according to claim 7, wherein said wall means extends radially inwardly to a point corresponding to the hub diameter.

9. A piston according to claim 8, wherein said annular space means extend to the next trailing second chamber means in relation to a direction opposite the direction of rotation of the piston.

10. A piston according to claim 1, wherein the second chamber means in the piston corners are provided on one side of the piston hub with aperture means located at the radially outer circumference of annular groove means and establishing a communication therewith.

11. A piston according to claim 10, wherein the annular groove means extend substantially parallelly to an end wall of the piston on the respective side thereof.

12. A piston according to claim 10, further comprising rib means closing off a portion of said aperture means within the forward area thereof in relation to the direction of rotation of the piston.

13. A piston according to claim 12, wherein said rib means close off about one-half of each aperture means.

14. A piston according to claim 12, wherein the second chamber means extend on the other side of the piston hub into annular space means disposed adjacent the piston hub, and wall means closing off said annular space means forwardly thereof in relation to the direction of rotation of the piston.

15. A piston according to claim 14, wherein said wall means extends radially inwardly to a point corresponding to the hub diameter.

16. A piston according to claim 14, wherein said annular space means extend to the next trailing second chamber means in relation to a direction opposite the direction of rotation of the piston.

17. A piston according to claim 1, wherein the second chamber means extend on the other side of the piston hub into annular space means disposed adjacent the piston hub, and wall means closing off said annular space means forwardly thereof in relation to the direction of rotation of the piston.

18. A piston according to claim 17, wherein said wall means extends radially inwardly to a point corresponding to the hub diameter.

19. A piston according to claim 18, wherein said annular space means extend to the next trailing second chamber means in relation to a direction opposite the direction of rotation of the piston.

20. A polygonal piston for a rotary internal combustion engine, especially of trochoidal construction, which includes a hub, end walls and outer walls forming piston flanks and piston corners, characterized by first heat-storing chamber means closed off on all sides and provided between the hub and the flanks, and second chamber means in the piston corners and open radially inwardly on both sides of the hub to provide flow passages for a cooling medium, an annular groove being provided which is located adjacent the hub and is defined in part by one of said end walls, said annular groove being in communication with said second chamber means by way of aperture means, rib means partially covering said aperture means, annular space means defined in part by the other end wall and in communication with said second chamber means, and wall means, disposed forwardly as moved in the direction of rotation, for closing off said annular space means so that each annular space means extends from the associated first chamber means to the next trailing second chamber means following in a direction opposite the direction of rotation of the piston.

21. A piston according to claim 20, wherein the rib means cover off approximately the forward half of the aperture means in relation to the direction of rotation of the piston.

22. A piston according to claim 21, wherein said first chamber means are located directly below the outer walls forming the flanks.

References Cited

UNITED STATES PATENTS

| 3,204,614 | 9/1965 | Huber | 123—8 |
| 3,266,468 | 8/1966 | Peras | 123—8 |
| 3,299,862 | 1/1967 | Peras | 123—8 |

FOREIGN PATENTS

| 1,000,354 | 8/1965 | Great Britain. |

CARROLL B. DORITZ, JR., Primary Examiner

U.S. Cl. X.R.

123—8